(12) United States Patent
Cheng

(10) Patent No.: US 7,517,609 B2
(45) Date of Patent: Apr. 14, 2009

(54) BATTERY COMPARTMENT ARRANGEMENT FOR REMOTE CONTROL BLIND

(76) Inventor: Li-Ming Cheng, No.215, Jeou Ju 1st Road, Sun Ming Dist., Kaohsiung City (TW)

( * ) Notice: Subject to any disclaimer, the term of this patent is extended or adjusted under 35 U.S.C. 154(b) by 857 days.

(21) Appl. No.: 11/003,441

(22) Filed: Dec. 6, 2004

(65) Prior Publication Data

US 2006/0121337 A1 Jun. 8, 2006

(51) Int. Cl.
*H01M 2/10* (2006.01)
*E06B 9/32* (2006.01)

(52) U.S. Cl. .................................. 429/97; 160/168.1 P
(58) Field of Classification Search ............ 160/168.1 P
See application file for complete search history.

(56) References Cited

U.S. PATENT DOCUMENTS 5,383,044 A * 1/1995 Borchardt et al. ........... 398/111

2002/0189768 A1* 12/2002 Anderson et al. ..... 160/168.1 P

\* cited by examiner

*Primary Examiner*—Dah-Wei D Yuan
*Assistant Examiner*—Maria J Laios
(74) *Attorney, Agent, or Firm*—Muncy, Geissler, Olds & Lowe, PLLC

(57) ABSTRACT

A battery compartment arrangement for remote control blind with remote control drive mountable at a mounting end of a headrail of the blind, the remote control drive comprises a case comprising a slit at one end for retaining an inserted portion of a front surface of the headrail, and a plate for dividing an internal space into a first compartment for receiving a motor and a second compartment, the second compartment including a cavity at its one outer end and a notch at its the other outer end; and a battery compartment received in and secured to the second compartment by snapping its pin and latch at both ends into the cavity and the notch respectively. Unfastening the pin and the latch will facilitate a replacement of at least one consumed cell.

9 Claims, 6 Drawing Sheets

BATTERY COMPARTMENT ARRANGEMENT FOR REMOTE CONTROL BLIND

FIELD OF THE INVENTION

The present invention relates to remote control blinds or shades and more particularly to a battery operated drive mounted in a remote control blind (e.g., Venetian blind) or shade having an improved battery compartment arrangement for easy battery replacement.

BACKGROUND OF THE INVENTION

Typically, a blind (e.g., roll-up or Venetian blind) or shade is adapted to raise or lower by pulling a lift cord. However, it is possible that a child may tie the cord about the neck to cause danger or even death. This is not a safe design. For solving this problem, a remote control blind or shade is devised.

A conventional remote control Venetian blind powered by battery is shown in FIG. 1. A Drive B is mounted in an internal space of a headrail A. The drive B comprises a transmission mechanism (e.g., one including worm gear, tube, and drum) B1, a motor B2, and a battery B3. A bottom rail A1 and a plurality of slats A2 are controlled by the transmission mechanism B1 by a cord passed therethrough. The motor B2 is coupled to the transmission mechanism B1 and the battery B3 is electrically coupled to the motor B2. In responses to enabling the battery B3 by remote control, the motor B2 is energized to activate the transmission mechanism B1. The bottom rail A1 and the slats A2 then raise or lower accordingly.

However, the prior art suffered from the following disadvantages when the consumed battery B3 is to be replaced. In detail, the headrail A is typically located on top of a window. A user has to put the hand into the space to remove the battery B3 from the headrail A prior to replacing the battery B3 with a new one. The hand is always raised during the replacement and this may cause muscle soreness. Alternatively, the opening of the space in the headrail A is very proximate to the ceiling of a room and a sidewall of the headrail A is abutted on wall of the room in another design for the sake of preserving the blind's appearance. In this case, the battery replacement is even tedious and time consuming since the headrail A has to be detached or tilted prior to the replacement.

It is understood that battery is not a lightweight object and the times of battery replacement is often due to its limited operating lifespan. As such, the above problem really bothers a user very much.

Thus, it is desirable to provide a novel battery compartment arrangement for remote control blind for easy battery replacement in order to overcome the above drawbacks of prior art.

SUMMARY OF THE INVENTION

It is an object of the present invention to provide a battery operated drive mounted in a remote control blind or shade. The drive has a battery compartment arrangement capable of facilitating a replacement of one or more consumed cells.

The advantages of the present invention are realized by providing a remote control drive mountable at a mounting end of a headrail of a blind or a shade, comprising a case comprising a slit at one end for retaining an inserted portion of a front surface of the headrail, and a plate for dividing an internal space into a first compartment for receiving a motor and a second compartment, the second compartment including a cavity at its one outer end and a notch at its the other outer end; and a battery compartment comprising at least one cell, the battery compartment received in and secured to the second compartment by snapping its snapping mechanism into both the cavity and the notch, whereby unfastening the snapping mechanism will facilitate a replacement of at least one consumed cell.

The above and other objects, features and advantages of the present invention will become apparent from the following detailed description taken with the accompanying drawings.

DETAILED DESCRIPTION OF THE PREFERRED EMBODIMENTS

Figure 1:
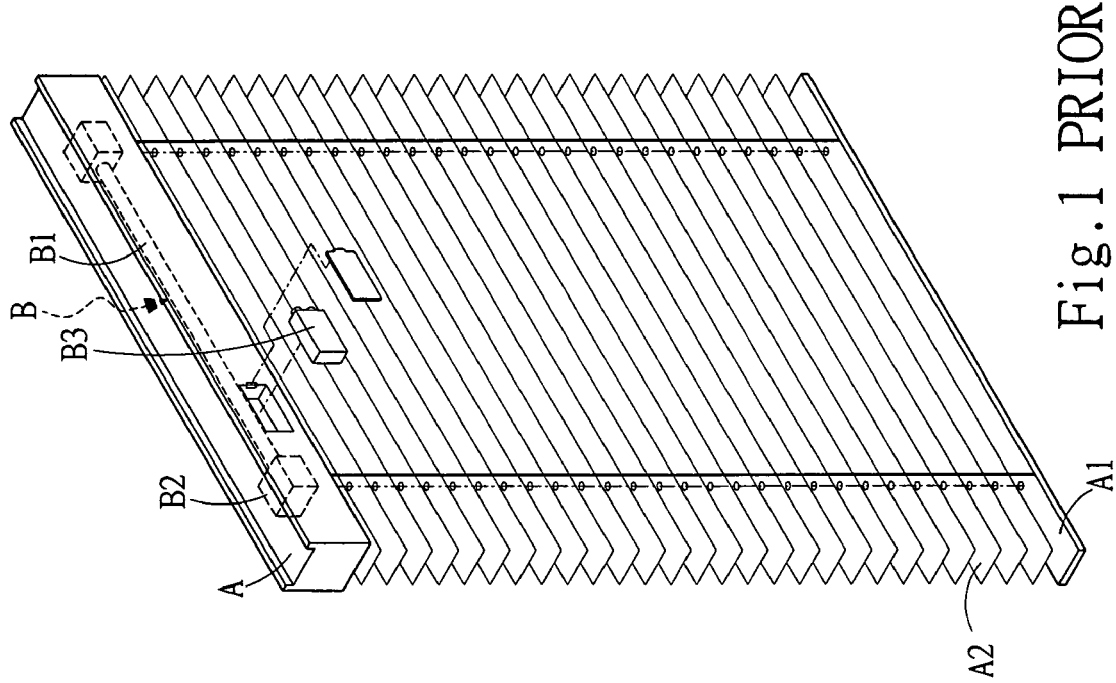
FIG. 1 is an exploded perspective view of a prior battery operated remote control blind.
Figure 2:
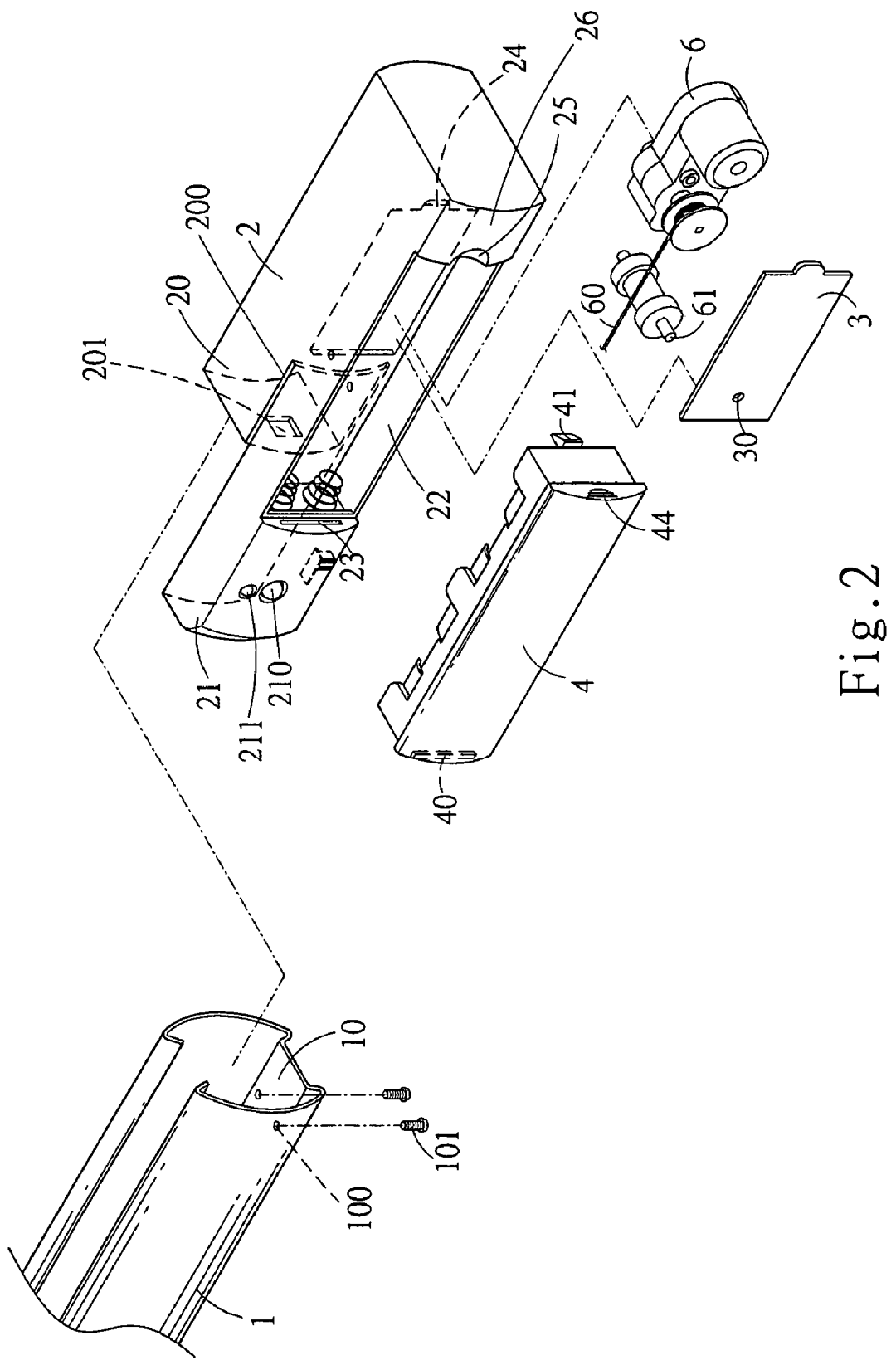
FIG. 2 is an exploded view of a battery operated drive according to the invention.
Figure 3:
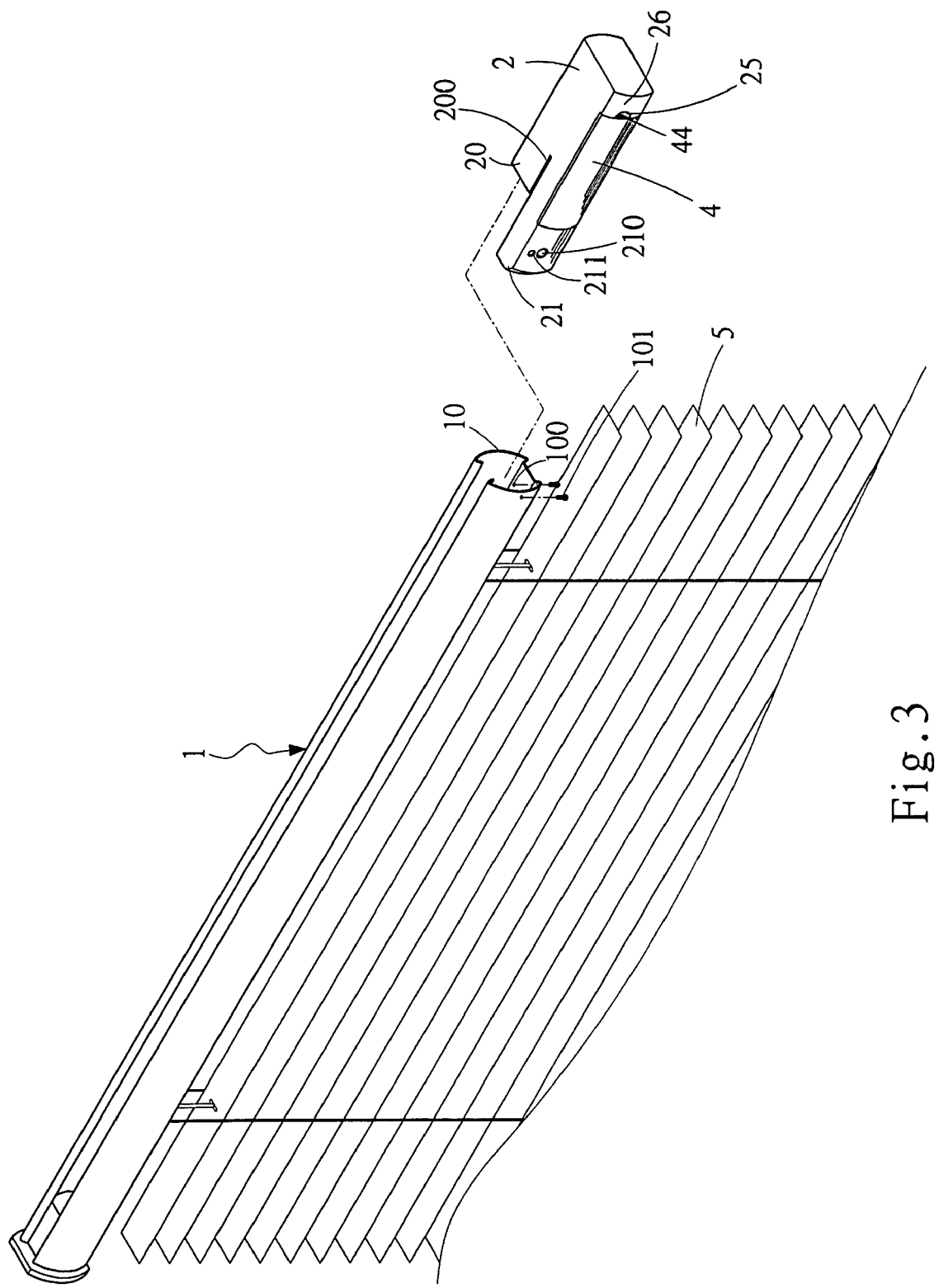
FIG. 3 is a perspective view of the assembled drive of FIG. 2 to be mounted in a headrail of a blind according to a preferred embodiment of the invention.

Referring to FIGS. 2 and 3, there is shown a battery operated drive mounted in a remote control blind (e.g., Venetian blind) according to a preferred embodiment of the invention. In combination the invention comprises a headrail 1, a case 2, a plate 3, and a battery compartment 4.

The headrail 1 of U-section comprises a mounting end 10 having two holes 100 on its bottom. The case 2 comprises a first projection 20 and a second projection 21 both at one end in which the second projection 21 is longer than the first projection 20 and is spaced from the first projection 20 by a slit 200. An opening 201 is formed at a free end of the first projection 20 for permitting a conductor 60 of a motor 6 to pass. An infrared signal receiver 210 and an indicator 211 are provided on a front surface of the second projection 21. A space 22 is formed inside the case 2 for mounting the motor 6. A cavity 23 is formed on the front surface of the second projection 21 at one side of the space 22 proximate the indicator 211. A notch 24 and an indentation 25 are formed on the front surface of the second projection 21 at the other side of the space 22. The other side of the space 22 is terminated at a point spaced from the other end of the case 2 by a distance 26. This ensures that the hand of a user has a sufficient space to open the battery compartment 4 by inserting a finger into the indentation 25 without being interfered by the wall 7 of a room (see FIG. 4).

The rectangular plate 3 comprises a hole 30 for permitting shaft 61 of the motor 6 to pass. A pin 40 is projected laterally from one end of the battery compartment 4 and is adapted to insert into the cavity 23 and a latch 41 is projected inwardly from the other end of the battery compartment 4 and is adapted to insert into the notch 24. A space 42 is formed in the battery compartment 4 for receiving a plurality of cells 43. A conductive contact 45 and a conductor 46 are formed at one end of the space 42 and are electrically coupled to the cells 43.

In assembly, the first projection 20 is inserted into the mounting end 10 with portion of a front surface of the headrail 1 tightly inserted into the slit 200. Next, drive screws 101 through the holes 100 into the case 2 for fastening the headrail 1 and the case 2 together. Next, install the motor 6 in the space 22. Further, mount the plate 3 in front of the motor 6. Next, insert the shaft 61 through the hole 30 so as to project the shaft 61 therefrom. Next, mount cells (e.g., cylindrical ones as shown) 43 in the space 42. Next, obliquely insert the pin 40 into the cavity 23 and then press the latch 41 to snap it into the notch 24. At this position, the battery compartment 4 is spaced from the motor 6 by the intermediate plate 3. Thus, the motor 6 is electrically coupled to the battery compartment 4 via the contact 45 and the conductor 46. In responses to enabling the cells 43 by remote control, the motor 6 is energized to raise or lower slats 5 of the blind.

Figure 4:
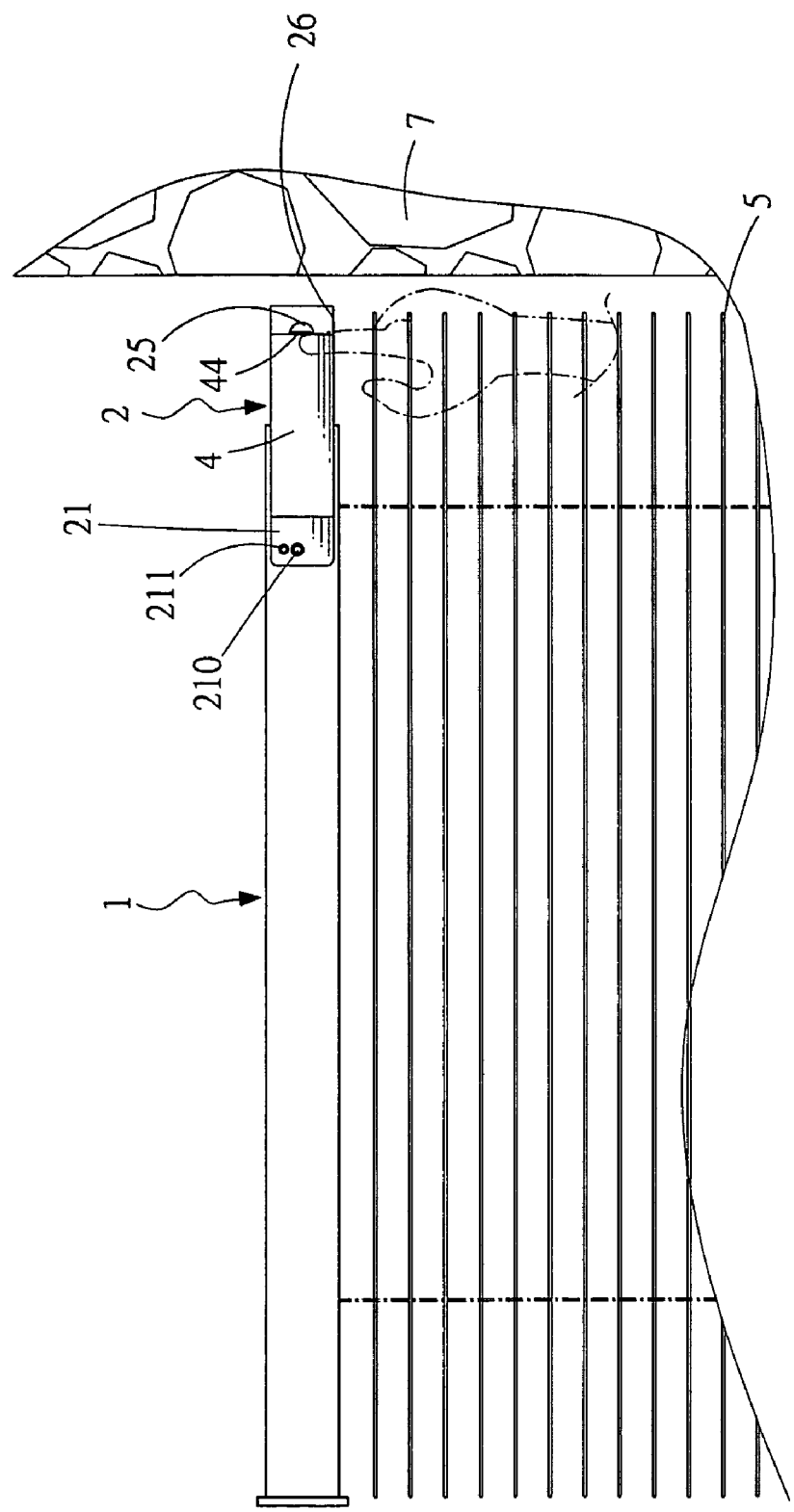
FIG. 4 is a front view of an upper portion of the blind mounted with the drive of FIG. 3 for illustrating an opening of its battery compartment.
Figure 5:
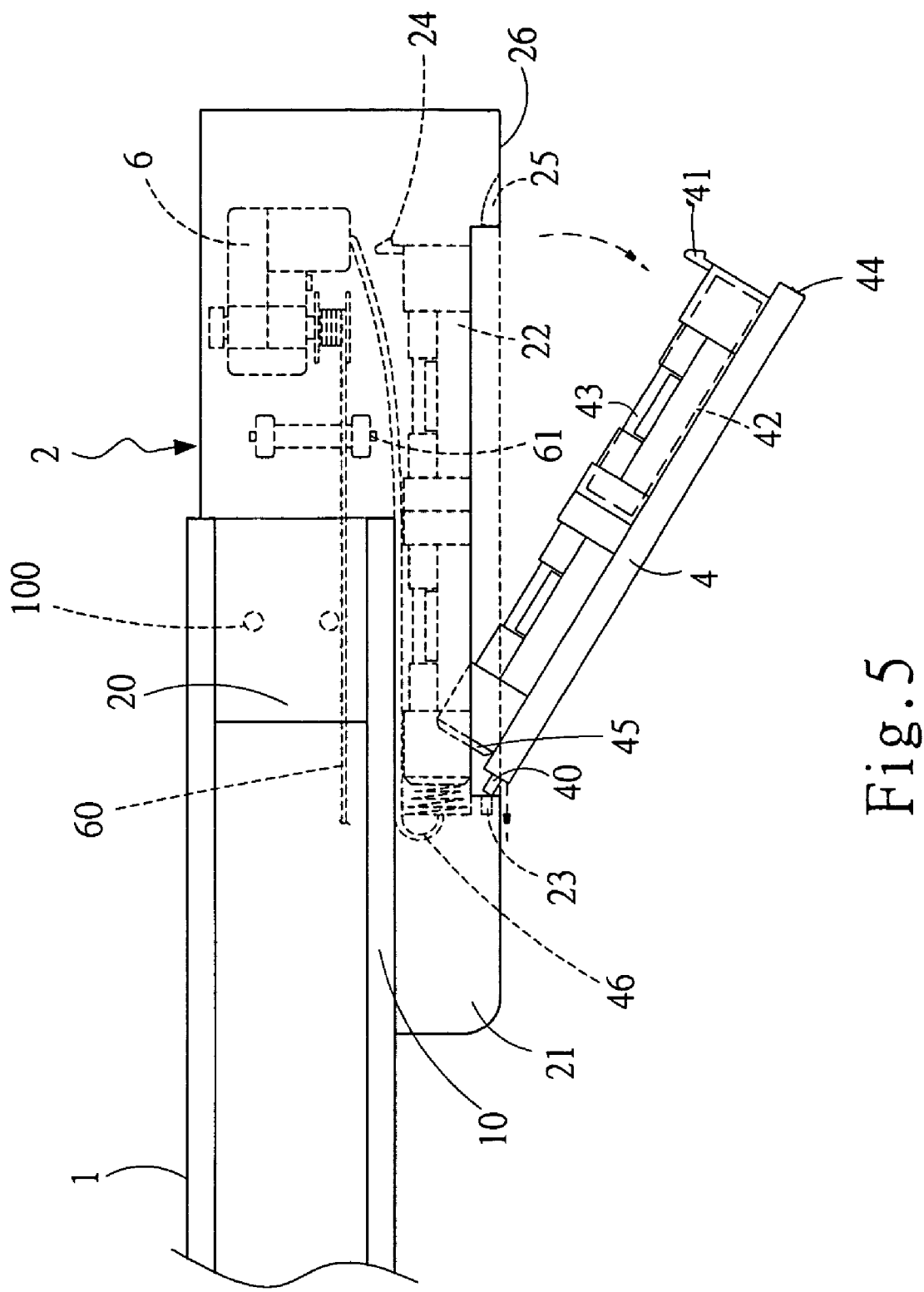
FIG. 5 is a schematic top view showing the open battery compartment of FIG. 4.

Referring to FIGS. 4 and 5 specifically, a user may pull a knurled portion 44 at the other end of the front surface of the battery compartment 4 to the front by inserting a finger into the adjacent indentation 25 until the latch 41 clears the notch 24. Next, pull the battery compartment 4 outwardly by pivoting about the pin 40. Next, the user can easily replace the consumed cells 43 with new ones. Pushing the battery compartment 4 into place again is facilitated since the battery compartment 4 is mounted in the forward side of the space 22. Thus, prior drawbacks such as a tedious and time consuming process of battery replacement and muscle soreness are eliminated.

Figure 6:
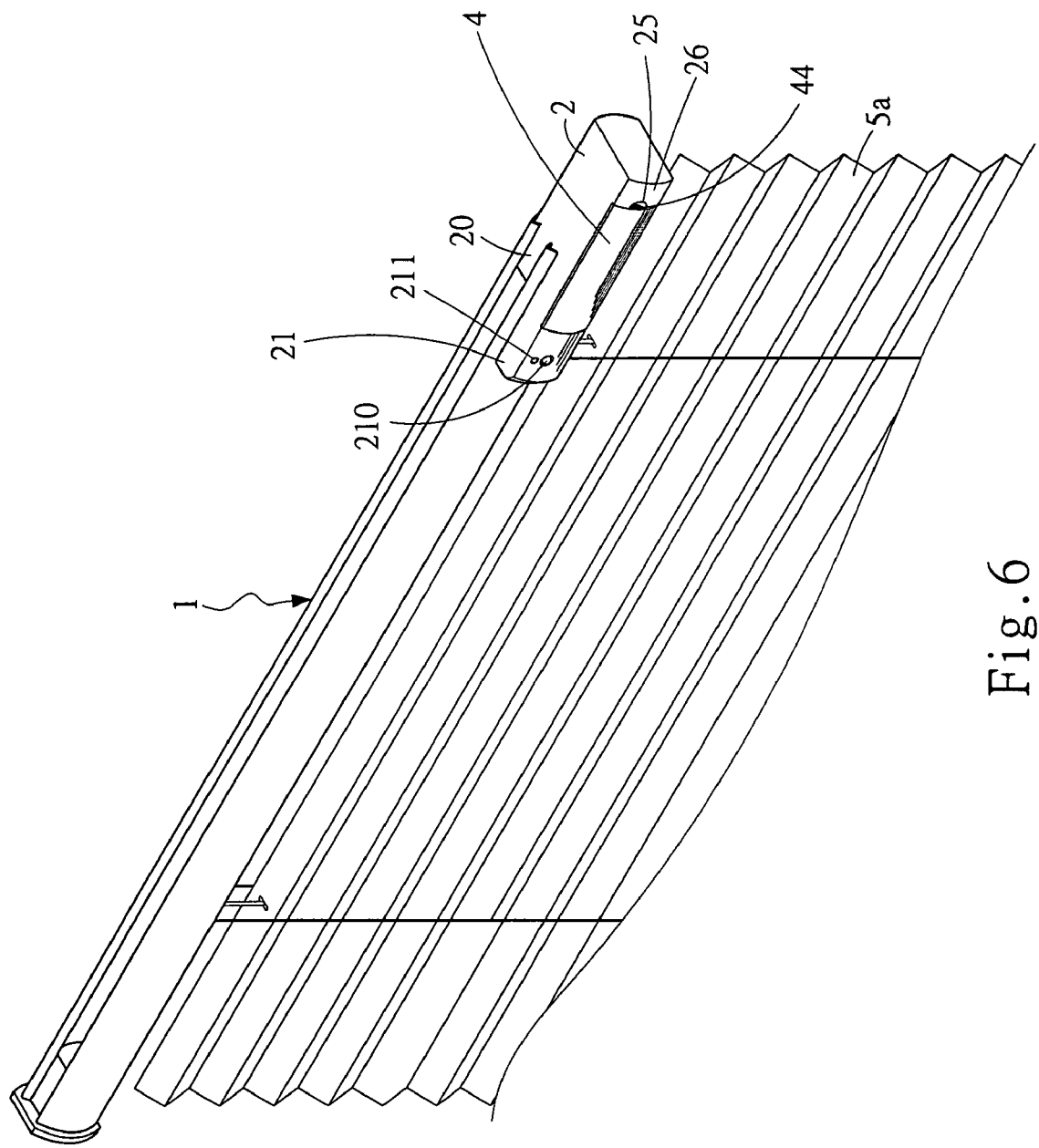
FIG. 6 is a perspective view of the drive mounted in a shade according to another preferred embodiment of the invention.

Referring to FIG. 6, it shows a perspective view of the drive mounted in a shade 5*a* according to another preferred embodiment of the invention. The mounting of the embodiment is substantially the same as the above embodiment.

While the invention herein disclosed has been described by means of specific embodiments, numerous modifications and variations could be made thereto by those skilled in the art without departing from the scope of the invention set forth in the claims.

What is claimed is:

1. A battery compartment arrangement for remote control blind with a remote control drive mountable at a mounting end of a headrail of the blind, comprising:
   a case comprising a longitudinal slit at one end for retaining an inserted end portion of a front surface of the headrail, and a plate dividing an internal space into a first compartment for receiving a motor and a second compartment, the second compartment including a cavity at its one outer end and a notch at its the other outer end; and
   a battery compartment comprising at least one cell, the battery compartment received in and secured to the second compartment by snapping a snapping mechanism into both the cavity and the notch,
   whereby unfastening the snapping mechanism will facilitate a replacement of at least one cell.

2. The battery compartment arrangement for remote control blind of claim 1, wherein the mounting end comprises a plurality of bottom holes.

3. The battery compartment arrangement for remote control blind of claim 1, wherein the case further comprises a rear projection and a front projection both at one end, and wherein the rear projection and the front projection are spaced by the slit.

4. The battery compartment arrangement for remote control blind of claim 3, further comprising an opening formed at a free end of the rear projection for permitting a conductor of the motor to pass.

5. The battery compartment arrangement for remote control blind of claim 3, further comprising an infrared signal receiver and an indicator provided on a front surface of the front projection.

6. The battery compartment arrangement for remote control blind of claim 1, further comprising an indentation formed at the other outer end of the second compartment proximate the notch.

7. The battery compartment arrangement for remote control blind of claim 1, wherein the plate comprises an aperture for permitting a shaft of the motor to pass.

8. The battery compartment arrangement for remote control blind of claim 1, wherein the snapping mechanism comprises a pin projected laterally from one end of the battery compartment, the pin adapted to insert into the cavity, and a latch projected inwardly from the other end of the battery compartment, the latch adapted to insert into the notch.

9. A battery compartment arrangement for remote control shade with remote control drive mountable at a mounting end of a headrail of the shade, comprising:
   a case comprising a longitudinal slit at one end for retaining an inserted end portion of a front surface of the headrail, and a plate dividing an internal space into a first compartment for receiving a motor and a second compartment, the second compartment including a cavity at its one outer end and a notch at its the other outer end; and
   a battery compartment comprising at least one cell, the battery compartment received in and secured to the second compartment by snapping a snapping mechanism into both the cavity and the notch,
   whereby unfastening the snapping mechanism will facilitate a replacement of at least one cell.

* * * * *